(12) United States Patent
Maruyama et al.

(10) Patent No.: US 8,916,509 B2
(45) Date of Patent: Dec. 23, 2014

(54) BEARING LUBRICANT AND USE THEREOF

(75) Inventors: Shingo Maruyama, Kobe (JP);
Yoshifumi Nakacho, Kobe (JP)

(73) Assignee: Moresco Corporation, Hyogo (JP)

( * ) Notice: Subject to any disclaimer, the term of this patent is extended or adjusted under 35 U.S.C. 154(b) by 0 days.

(21) Appl. No.: 13/983,916

(22) PCT Filed: Jan. 20, 2012

(86) PCT No.: PCT/JP2012/051269
§ 371 (c)(1),
(2), (4) Date: Aug. 6, 2013

(87) PCT Pub. No.: WO2012/108251
PCT Pub. Date: Aug. 16, 2012

(65) Prior Publication Data
US 2013/0313931 A1 Nov. 28, 2013

(30) Foreign Application Priority Data
Feb. 10, 2011 (JP) .................. 2011-027674

(51) Int. Cl.
| | | |
|---|---|---|
| *C10M 169/04* | (2006.01) | |
| *F16C 32/06* | (2006.01) | |
| *F16C 1/00* | (2006.01) | |
| *C07C 69/96* | (2006.01) | |
| *C10M 105/48* | (2006.01) | |
| *F16C 17/00* | (2006.01) | |
| *H02K 7/08* | (2006.01) | |
| *F16C 33/66* | (2006.01) | |
| *F16C 33/10* | (2006.01) | |

(52) U.S. Cl.
CPC .............. *C10M 105/48* (2013.01); *F16C 17/00* (2013.01); *F16C 32/06* (2013.01); *H02K 7/08* (2013.01); *C10M 2207/325* (2013.01); *C10N 2230/02* (2013.01); *C10N 2230/06* (2013.01); *C10N 2230/08* (2013.01); *C10N 2240/02* (2013.01); *C10N 2240/204* (2013.01); *C10N 2250/10* (2013.01); *F16C 33/6688* (2013.01); *F16C 33/109* (2013.01)
USPC ............. 508/116; 310/90; 384/100; 384/322; 558/276

(58) Field of Classification Search
USPC ................ 310/90; 384/100, 322; 558/276; 508/116
See application file for complete search history.

(56) References Cited

U.S. PATENT DOCUMENTS

| | | | | |
|---|---|---|---|---|
| 3,657,310 | A | * | 4/1972 | Frevel .......................... 558/276 |
| 5,022,492 | A | | 6/1991 | Ohno et al. |
| 5,114,605 | A | | 5/1992 | Mizui et al. |
| RE34,914 | E | | 4/1995 | Mizui et al. |
| 5,569,408 | A | | 10/1996 | Peppmoller et al. |
| 5,789,836 | A | | 8/1998 | Hayakawa |
| 6,730,639 | B1 | * | 5/2004 | Miyamoto et al. ............ 508/364 |
| 2006/0199747 | A1 | * | 9/2006 | Kamimura et al. ........... 508/528 |
| 2010/0035773 | A1 | * | 2/2010 | Hirata et al. .................. 508/100 |

FOREIGN PATENT DOCUMENTS

| | | |
|---|---|---|
| AU | 4508789 A | 5/1990 |
| AU | 616073 B2 | 10/1991 |
| CA | 2002693 A1 | 5/1990 |
| CN | 1068812 A | 2/1993 |
| EP | 0406433 B1 | 3/1997 |
| EP | 0406433 B9 | 10/2007 |
| GB | 1353249 A | 5/1974 |
| JP | S4837568 A | 6/1973 |
| JP | H01188592 A | 7/1989 |
| JP | H01279117 A | 11/1989 |
| JP | H04357318 A | 12/1992 |
| JP | 07011273 A | 1/1995 |
| JP | H10183159 A | 7/1998 |
| JP | H11236584 A | 8/1999 |
| JP | 3265128 B2 | 3/2002 |
| WO | WO-9005172 A1 | 5/1990 |

OTHER PUBLICATIONS

International Search Report PCT/ISA/210 for International Application No. PCT/JP2012/051269 Dated on Jan. 20, 2012.
International Written Opinion PCT/ISA/237 for International Application No. PCT/JP2012/051269 Dated on Jan. 20, 2012.
Office Action dated Mar. 6, 2014 issued in Chinese Application No. 201280007833.X with English Translation.

\* cited by examiner

*Primary Examiner* — Vishal Vasisth
(74) *Attorney, Agent, or Firm* — Harness, Dickey & Pierce, P.L.C.

(57) ABSTRACT

A bearing lubricant of the present invention contains a compound represented by the following general formula:

$$C_fH_{2f+1}-R^1{}_a-O-(C=O)-O-R^2{}_b-C_gH_{2g+1}$$

wherein O represents an oxygen atom; C represents a carbon atom; H represents a hydrogen atom; $R^1$ and $R^2$ independently represent a C2-C48 oxaalkylene group having 1 to 6 oxygen atoms; a and b independently represent an integer of 0 or 1 and satisfy $a+b\geq 1$; and f and g independently represent an integer of 1 to 12.

14 Claims, No Drawings

BEARING LUBRICANT AND USE THEREOF

This application is a 371 of PCT/JP2012/051269, filed Jan. 20, 2012.

TECHNICAL FIELD

The present invention relates to (i) a bearing lubricant that is highly power-saving, heat-resistant and antistatic and has an excellent viscosity property even at low temperatures and (ii) use thereof.

BACKGROUND ART

As industries have diversified and advanced in recent years, electronic devices such as audio-visual devices and personal computers have been dramatically reduced in size and weight, increased in memory capacity, and increased in information processing speed. Such electronic devices employ various rotating devices, for example, rotating devices for driving magnetic disks and optical discs such as FD, MO, zip, mini disc, compact disc (CD), DVD and hard disk. The reduction in size and weight and the increase in memory capacity and information processing speed of these electronic devices are greatly attributed to improvement in bearings, which are essential to the rotating devices. In particular, a fluid bearing, which is made up of a sleeve and a shaft facing each other via a lubricant, is not only suitable for reducing size and weight of electronic devices but also is highly silent and economical, because it does not have a ball bearing. Because of these characteristics, the fluid bearing has been increasingly used in personal computers, audio devices, visual devices, car navigation systems and the like.

There have been proposed lubricants and bearing fluids for use in the fluid bearing. Examples of such lubricants and fluids include: olefinic synthetic oils, diester synthetic oils and neopentyl polyol ester synthetic oils; those made from grease which contains (i) one selected from squalane and naphthenic mineral oils or a combination of any of these oils as a base oil and (ii) a urea compound as a consistency increasing agent (thickener) (refer to Patent Literature 1); those containing (i) a fatty acid triester, which is obtained from trimethylolpropane, as a base oil and (ii) a hindered phenol antioxidant and a benzotriazole derivative (refer to Patent Literature 2); those containing, as a base oil, a specific monocarboxylate ester having a phenyl group and/or a specific dicarboxylate ester (refer to Patent Literature 3); those containing a single-component composition as a base oil (refer to Patent Literature 4); those containing (i) a carbonate ester compound as a main component of a base oil and (ii) a sulfur-containing phenolic antioxidant and zinc extreme-pressure agent (refer to Patent Literature 5); those containing (i) a mixture containing a specific saturated alkyl carbonate ester as a base oil and (ii) a phenolic antioxidant (refer to Patent Literature 6); and those containing (i) a specific dialkyl carbonate ester as a base oil solvent and (ii) magnetic particles dispersed in the base oil solvent (refer to Patent Literature 7).

CITATION LIST

Patent Literatures

Patent Literature 1
Japanese Patent Application Publication, Tokukaihei, No. 01-279117 A (Publication Date: Nov. 9, 1989)
Patent Literature 2
Japanese Patent Application Publication, Tokukaihei, No. 01-188592 A (Publication Date: Jul. 27, 1989)
Patent Literature 3
Japanese Patent Application Publication, Tokukaihei, No. 04-357318 A (Publication Date: Dec. 10, 1992)
Patent Literature 4
Japanese Patent No. 2621329 (Publication Date: Jun. 18, 1997)
Patent Literature 5
Japanese Patent No. 3265128 (Publication Date: Mar. 11, 2002)
Patent Literature 6
Japanese Patent Application Publication, Tokukaihei, No. 10-183159 A (Publication Date: Jul. 14, 1998)
Patent Literature 7
Japanese Patent Application Publication, Tokukai, No. 1996-266006 A (Publication Date: Oct. 11, 1996)

SUMMARY OF INVENTION

Technical Problem

However, sometimes it is not good enough for bearing lubricants to just have the basic properties they are required to have (e.g., lubricating ability, stability against deterioration (life), anti-sludge formation property, anti-wearing property, and anti-corrosion property). The bearing lubricants are sometimes required to also have a low viscosity (be highly power-saving) and be highly heat-resistant, antistatic and have an excellent viscosity property even at low temperatures (hereinafter referred to as a low-temperature viscosity property).

For example, electronic devices such as audio-visual devices and personal computers have been increasingly required not only to be capable of high-speed processing of large-amount information but also to be further reduced in size. Such electronic devices can be reduced in size by increasing the lifetime of or reducing the capacity of a battery contained in them. Therefore, the electronic devices have been strongly required to be more power-saving. In order for the electronic devices to be more power-saving, one way is to use a lubricant having a low viscosity as a bearing lubricant. However, usually, lubricants having a lower viscosity are less heat-resistant. Therefore, when a conventional bearing lubricant is used for a bearing, the following occurs. That is, as the speed at which the bearing is rotated is increased for high-speed processing of large-amount information, the temperature inside the bearing increases due to the high-speed rotation of the bearing. As the temperature of the bearing increases, more of the lubricant evaporates. As a result, the bearing likely causes more power loss due to lack of lubrication inside the bearing.

For example, in the case of a hard disk device, the following may occur. If a lubricant in a minute gap between a shaft and a bearing sleeve of the bearing has a high volume resistivity, the bearing is likely to accumulate static electricity when the hard disk drive is operated at high speed. As a result, important electronic components such as a magnetic disk may suffer electrostatic destruction.

Therefore, in order to meet the requirements such as high-speed information processing and miniaturization of devices, the lubricant is required to not only have the foregoing basic properties but also be more power-saving, heat-resistant and antistatic than conventional lubricants for fluid bearings. That is, there is a demand for a lubricant that has a lower viscosity, suffers less evaporation loss, and has a lower volume resistivity than conventional lubricants for fluid bearings.

Furthermore, as the foregoing information processing devices have been popularized, there has been an increasing number of cases where they are used under harsh environments. In particular, car navigation systems etc. which are mounted on a vehicle are required, considering the environment in which cars are used, to be resistant to a wide range of temperatures including those of cold climates and hot sunlight. Therefore, in the case where a bearing lubricant is used in on-vehicle devices, it is required to be usable without problems in a wide range of temperatures from, for example, −20° C. to 120° C. To this end, there is a demand for a lubricant that keeps a low viscosity even at low temperatures and suffers little evaporation loss even at high temperatures.

However, none of the foregoing conventional bearing lubricants meet all of the following requirements: power-saving, heat-resistant, antistatic, and good low-temperature viscosity property.

The present invention has been made in view of the above problem, and an object of the present invention is to provide (i) a bearing lubricant that not only has the basic properties it is required to have but also has a lower viscosity and is more heat-resistant, more antistatic and has a better low-temperature viscosity property than conventional bearing lubricants and (ii) use of the bearing lubricant.

Solution to Problem

The inventors of the present invention diligently worked in order to attain the above object, and became the first persons to find that, by using as a base oil a compound which is a dialkyl carbonate ester whose alkyl chain has an ether bond in its structure, it is possible to obtain a bearing lubricant that has a lower viscosity and is more heat-resistant, more antistatic and has a better low-temperature viscosity property than conventional bearing lubricants. On the basis of this new finding, the inventors accomplished the present invention.

That is, a bearing lubricant in accordance with the present invention contains a compound represented by the following general formula (1):

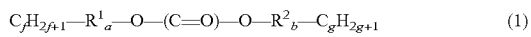

$$C_fH_{2f+1}-R^1_a-O-(C=O)-O-R^2_b-C_gH_{2g+1} \quad (1)$$

wherein O represents an oxygen atom; C represents a carbon atom; H represents a hydrogen atom; $R^1$ and $R^2$ independently represent a C2-C48 oxaalkylene group having 1 to 6 oxygen atoms; a and b independently represent an integer of 0 or 1 and satisfy a+b≥1; and f and g independently represent an integer of 1 to 12.

Alternatively, a bearing lubricant in accordance with the present invention contains a compound represented by the following general formula (1'):

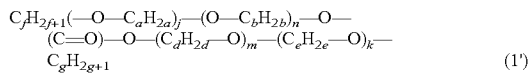

$$C_fH_{2f+1}(-O-C_aH_{2a})_j-(O-C_bH_{2b})_n-O-$$
$$(C=O)-O-(C_dH_{2d}-O)_m-(C_eH_{2e}-O)_k-$$
$$C_gH_{2g+1} \quad (1')$$

wherein O represents an oxygen atom; C represents a carbon atom; H represents a hydrogen atom; a, b, d and e independently represent an integer of 2 to 8; j, k, m and n independently represent an integer of 0 to 3 and satisfy j+k+m+n≥1; and f and g independently represent an integer of 1 to 12.

The bearing lubricant in accordance with the present invention can be a lubricant for a fluid bearing or a lubricant for an impregnated bearing.

A bearing in accordance with the present invention is lubricated with use of the foregoing bearing lubricant in accordance with the present invention.

The bearing in accordance with the present invention can be a fluid bearing or an impregnated bearing.

A method for lubricating a bearing in accordance with the present invention includes: lubricating a bearing in accordance with the present invention with use of a bearing lubricant in accordance with the present invention.

A motor in accordance with the present invention includes a bearing in accordance with the present invention.

The present invention encompasses use of a bearing lubricant in accordance with the present invention for production of a grease.

A grease in accordance with the present invention contains a bearing lubricant in accordance with the present invention.

It should be noted that the compound which is a dialkyl carbonate ester whose alkyl chain has an ether bond in its structure is known to be used as a lubricant contained in a composition for coolant (Japanese Patent Application Publication, Tokukaihei, No. 11-236584 A (Publication Date: Aug. 31, 1999)). However, this merely shows that a lubrication oil containing the compound which is a dialkyl carbonate ester whose alkyl chain has an ether bond in its structure has good compatibility with carbon dioxide gas (coolant). A composition for coolant and a bearing lubricant, as lubricants, are required to have completely different properties. Therefore, it is not possible to predict, from the above patent literature, that a lubricant containing the above compound is noticeably better in viscosity, heat resistance, antistatic property and low-temperature viscosity property than conventional bearing lubricants when used as a lubricant for a bearing. Therefore, the present invention cannot be easily arrived at on the basis of the description in the above patent literature.

Advantageous Effects of Invention

A bearing lubricant in accordance with the present invention contains a compound represented by the general formula (1) or a compound represented by the general formula (1'), and therefore has a lower viscosity and is more heat-resistant, antistatic and has a better low-temperature viscosity property than conventional bearing lubricants. Furthermore, the bearing lubricant in accordance with the present invention has well-balanced power-saving property, heat resistance, antistatic property and low-temperature viscosity property.

Therefore, by using the bearing lubricant of the present invention as a working fluid for lubrication of a bearing, it is possible to achieve long-term stability and durability etc. even in the case where the bearing is rotated at high speed. This makes it possible to increase the lifetime of the bearing, and also possible to cause the bearing to be more power-saving.

As such, the bearing lubricant in accordance with the present invention is particularly excellent when used as a lubricant for a bearing for use in a rotating device etc. of an electronic device, such as an audio-visual device or a personal computer, which has been required to be smaller in size, lighter in weight, larger in memory capacity and higher in information processing speed.

DESCRIPTION OF EMBODIMENTS

The following description will discuss embodiments of the present invention in detail. Note, however, that the present invention is not limited to the embodiments, but may be altered in various manners within the scope of the description. Furthermore, all the academic literatures and patent literatures cited in this specification are of assistance as references in this specification. Further note that, in this specification, the range "A to B" (where A and B are numerical values) means "not less than A but not more than B", unless otherwise specified.

The following description about the present invention deals with, in the order named, (1) a bearing lubricant in accordance with the present invention, (2) a bearing in accordance with the present invention, (3) a method for lubricating a bearing in accordance with the present invention, (4) a motor in accordance with the present invention, and (5) a grease in accordance with the present invention.

[1. Bearing Lubricant in Accordance with the Present Invention]

A bearing lubricant in accordance with the present invention (hereinafter also referred to as a "lubricant of the present invention") is characterized by containing a compound represented by the following general formula (1):

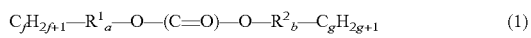

$C_fH_{2f+1}$—$R^1_a$—O—(C=O)—O—$R^2_b$—$C_gH_{2g+1}$ (1)

(wherein O represents an oxygen atom; C represents a carbon atom; H represents a hydrogen atom; $R^1$ and $R^2$ independently represent a C2-C48 oxaalkylene group having 1 to 6 oxygen atoms; a and b independently represent an integer of 0 or 1 and satisfy a+b≥1; and f and g independently represent an integer of 1 to 12). That is, the lubricant of the present invention is a lubricant that contains, as a base oil, the compound represented by the general formula (1).

Note here that the "oxaalkylene group" means an alkylene group that has one or more oxygen atoms. In other words, the "oxaalkylene group" is an alkylene group (—$C_nH_{2n}$—) in which at least one methylene group (—($CH_2$)—) is substituted by an oxygen atom (note that, there is no particular limitation as to which methylene group is substituted by the oxygen atom). In the "oxaalkylene group", the oxygen atom is bound to carbon atoms by forming an ether bond (—O—). Therefore, in this specification, such an oxygen atom may be specifically referred to as an "ether oxygen atom".

Therefore, the general formula (1) can also be represented as the following general formula (1'):

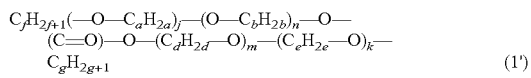

$C_fH_{2f+1}$(—O—$C_aH_{2a}$)$_j$—(O—$C_bH_{2b}$)$_n$—O—
(C=O)—O—($C_dH_{2d}$—O)$_m$—($C_eH_{2e}$—O)$_k$—
$C_gH_{2g+1}$ (1')

(wherein O represents an oxygen atom; C represents a carbon atom; H represents a hydrogen atom; a, b, d and e independently represent an integer of 2 to 8; j, k, m and n independently represent an integer of 0 to 3 and satisfy j+k+m+n≥1; and f and g independently represent an integer of 1 to 12). Therefore, the lubricant of the present invention may contain a compound represented by the general formula (1').

It is easy for those skilled in the art to understand that the structural units "(—O—$C_aH_{2a}$)$_j$—(O—$C_bH_{2b}$)$_n$—" and "—($C_dH_{2d}$—O)$_m$—($C_eH_{2e}$—O)$_k$—" in the general formula (1') correspond to the structural units "—$R^1_a$—" and "—$R^2_b$—" in the general formula (1), respectively.

Examples of C1-C12 alkyl groups, which may be "$C_fH_{2f+1}$" and "$C_gH_{2g+1}$" in the general formula (1) and the general formula (1'), include: methyl group, ethyl group, propyl group, isopropyl group, butyl group, isobutyl group, amyl group, isoamyl group, hexyl group, cyclohexyl group, methylhexyl group, heptyl group, methylheptyl group, octyl group, 2-ethylhexyl group, nonyl group, isononyl group, 3,5,5-trimethylhexyl group, decyl group, isodecyl group, and lauryl group.

Furthermore, the "oxaalkylene group" in the general formula (1) may have a straight-chain structure or a branched structure. Examples of C2-C8 alkylene groups which may be "$C_aH_{2a}$", "$C_bH_{2b}$", "$C_dH_{2d}$" and "$C_eH_{2e}$" in the general formula (1') include: ethylene group, propylene group and butylene group. Each of the C2-C8 alkylene groups may have a straight-chain structure or a branched structure.

The compound represented by the general formula (1) can be obtained by, for example, (i) known transesterification reaction between alcohols represented by the following general formulae (2) and (3) and diphenyl carbonate or (ii) substitution reaction between the alcohols represented by the following general formulae (2) and (3) and chloroformate ester:

$C_fH_{2f+1}$—$R^1_a$—O—H (2)

H—O—$R^2_b$—$C_gH_{2g+1}$ (3)

(wherein O represents an oxygen atom; C represents a carbon atom; H represents a hydrogen atom; $R^1$ and $R^2$ independently represent a C2-C48 oxaalkylene group having 1 to 6 oxygen atoms; a and b independently represent an integer of 0 or 1 and satisfy a+b≥1; and f and g independently represent an integer of 1 to 12).

Similarly, the compound represented by the general formula (1') can be obtained by, for example, (i) known transesterification reaction between alcohols represented by the following general formulae (2') and (3') and diphenyl carbonate or (ii) substitution reaction between the alcohols represented by the following general formulae (2') and (3') and chloroformate ester:

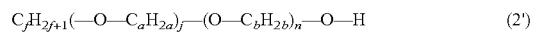

$C_fH_{2f+1}$(—O—$C_aH_{2a}$)$_j$—(O—$C_bH_{2b}$)$_n$—O—H (2')

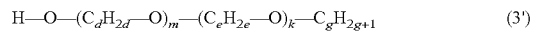

H—O—($C_dH_{2d}$—O)$_m$—($C_eH_{2e}$—O)$_k$—$C_gH_{2g+1}$ (3')

(wherein O represents an oxygen atom; C represents a carbon atom; H represents a hydrogen atom; a, b, d and e independently represent an integer of 2 to 8; j, k, m and n independently represent an integer of 0 to 3 and satisfy j+k+m+n≥1; and f and g independently represent an integer of 1 to 12).

Note, however, that the compound represented by the general formula (1) and the compound represented by the general formula (1') can be synthesized also by methods other than the above methods.

After the sufficient transesterification reaction or substitution reaction, a known method (e.g., vacuum distillation) is performed as needed to purify a product, thereby obtaining the compound represented by the general formula (1) or the compound represented by the general formula (1'). Such a compound can be used as a base oil of a bearing lubricant.

It is further preferable that the lubricant of the present invention contains, as a base oil, the compound represented by the general formula (1) wherein $R^1$ and $R^2$ independently represent a C2-C16 oxaalkylene group having 1 to 4 oxygen atoms; a and b independently represent an integer of 0 or 1 and satisfy a+b≥1; and f and g independently represent an integer of 4 to 8. In other words, it is further preferable that the lubricant of the present invention contains, as a base oil, the compound represented by the general formula (1') wherein a, b, d and e independently represent an integer of 2 to 4; j, k, m and n independently represent an integer of 0 to 2 and satisfy j+k+m+n≥1; and f and g independently represent an integer of 4 to 8.

The compound represented by the general formula (1) or the compound represented by the general formula (1') is contained in an amount of preferably not less than 50 wt %, further preferably not less than 80 wt %, and most preferably not less than 95 wt %, relative to the total weight of the lubricant. When the amount of the compound contained in the lubricant of the present invention is within the above range, the lubricant can be used as a bearing lubricant that has a lower viscosity (is more power-saving) and is more heat-resistant, antistatic and has a better low-temperature viscosity property than conventional bearing lubricants.

The lubricant of the present invention may contain, in addition to the compound, (i) a hydrocarbon oil such as mineral oil, olefin polymer or alkylbenzene, (ii) polyglycol, (iii) polyvinyl ether, (iv) ketone, (v) polyphenyl ether, (vi) silicone, (vii) polysiloxane, (viii) perfluoroether, and/or (ix) an oxygen-atom-containing synthetic oil such as ester or ether other than the compounds represented by the general formulae (1) and (1'). Such synthetic oils may be contained in an amount of preferably 1 wt % to 50 wt % relative to the total weight of the lubricant.

The lubricant of the present invention preferably has a kinetic viscosity at 40° C. (hereinafter also referred to as "40° C. kinetic viscosity") of 5 mm$^2$/s to 100 mm$^2$/s, and further preferably 6 mm$^2$/s to 13 mm$^2$/s. When the lubricant has a 40° C. kinetic viscosity within the above range, the lubricant can be used as a bearing lubricant that has a particularly excellent lubricating property and power-saving property.

Furthermore, when the amount of evaporation of the lubricant of the present invention is preferably not more than 5% and further preferably not more than 3%, the lubricant can be used as a bearing lubricant that is particularly highly heat-resistant.

Furthermore, when the volume resistivity of the lubricant of the present invention is preferably not more than $5\times10^{12}$ Ω·cm and further preferably not more than $1\times10^{12}$ Ω·cm, the lubricant can be used as a bearing lubricant that is particularly highly antistatic.

Furthermore, when (i) the viscosity index of the lubricant of the present invention is preferably not less than 80 and further preferably not less than 110 and (ii) the pour point of the lubricant is preferably not higher than −20° C. and further preferably not higher than −30° C., the lubricant can be used as a bearing lubricant that has a particularly excellent low-temperature viscosity property.

It should be noted that the "kinetic viscosity at 40° C.", "amount of evaporation", "volume resistivity", "viscosity index" and "pour point" can be measured by the methods described in Examples (described later).

As has been described, the lubricant of the present invention has a lower viscosity (is more power-saving) and is more heat-resistant, antistatic and has a better low-temperature viscosity property than conventional bearing lubricants. In addition, these properties are well-balanced. Accordingly, by using the lubricant of the present invention as a working fluid for lubrication of a bearing, it is possible to achieve long-term stability and durability etc. even in the case where the bearing is rotated at high speed, and also possible to cause the bearing to be more power-saving. As such, the lubricant of the present invention can be used effectively as a lubricant for a bearing for use in a rotating device etc. of an electronic device, such as an audio-visual device or a personal computer, which has been required to be smaller in size, lighter in weight, larger in memory capacity and higher in information processing speed.

Furthermore, the lubricant of the present invention may contain, in addition to the compound represented by the general formula (1) or the general formula (1') which serves as a base oil, various additives to achieve better practical properties. Examples of the additives include: phenolic antioxidants; amine antioxidants; sulfuric antioxidants; phosphorus antioxidants; epoxy compounds (hydrolysis resistance improvers); benzotriazole derivatives (metal deactivators); and zinc dithiophosphate (extreme-pressure agents).

One additive or two or more additives selected from those listed above may be each added in an amount of 0.01 wt % to 5 wt % relative to the total weight of the lubricant. This allows the lubricant of the present invention to have better practical properties.

Examples of the "phenolic antioxidants" include: 2,6-di-t-butylphenol, 2,6-di-t-butyl-4-methylphenol, 2,6-di-t-butyl-4-ethylphenol, 2,6-di-t-butyl-4-n-butylphenol (ethyl 744), 4,4'-methylenebis(2,6-di-t-butylphenol), and 2,2'-thiobis(4-methyl-6-t-butylphenol. Examples of the "amine antioxidants" include: N-phenyl-α-naphthylamine and p,p'-dioctyl-diphenylamine. Examples of the "sulfuric antioxidants" include phenothiazine.

Other usable antioxidants, anti-wearing agents and extreme-pressure agents include: phosphorous compounds such as (i) phosphates such as tricresyl phosphate, cresyl diphenyl phosphate, alkyl phenyl phosphates, tributyl phosphate, and dibutyl phosphate, (ii) phosphites such as tributyl phosphite, triphenyl phosphite, tricresyl phosphite, and (iii) amine salts of those listed above; sulfuric compounds such as (i) sulfurized fatty acids such as sulfurized oil and sulfurized oleic acid, (ii) dibenzyldisulfide, (iii) sulfurized olefin, and (iv) dialkyl disulfide; and organometallic compounds such as Zn-dialkyl dithio phosphate, Zn-dialkyl dithiocarbamate, Mo-dialkyl dithio phosphate, and Mo-dialkyl dithiocarbamate.

The lubricant of the present invention can be used as a lubricant for any bearing that is lubricated with the use of the lubricant. For example, the lubricant of the present invention can be suitably used as a lubricant for any bearing that includes a shaft and a bearing sleeve and is arranged such that (i) the shaft and the bearing sleeve are rotatably fit with each other with a minute gap between them, (ii) a working fluid (lubricant) is contained in the minute gap so as to form a lubricating film and (iii) the shaft and the bearing sleeve are slidingly moved relative to each other via the lubricating film. Such a bearing is generally called a "slide bearing".

Furthermore, the lubricant of the present invention can be suitably used also as a lubricant for a fluid bearing (fluid dynamic bearing or hydrostatic bearing) or an impregnated bearing (also called "oil-impregnated bearing").

Moreover, the lubricant of the present invention can be suitably used for production of a grease. It is possible to produce a grease by using the lubricant of the present invention as a grease base oil. Such a grease will be described later.

[2. Bearing in Accordance with the Present Invention]

A bearing in accordance with the present invention (hereinafter also referred to as a "bearing of the present invention") is not limited to a particular configuration, provided that it is a bearing to be lubricated with the use of the foregoing lubricant of the present invention. It should be noted that the phrase "lubricated with the use of the lubricant of the present invention" means that members facing each other via the lubricant of the present invention are slidingly moved relative to each other via the lubricant of the present invention.

Such a bearing is, for example, a fluid bearing, an impregnated bearing or the like. Since the lubricant of the present invention has been described in the foregoing [1. Bearing lubricant in accordance with the present invention], its descriptions are omitted here.

The "fluid bearing" is not limited to a particular configuration, provided that it is a known fluid bearing which (i) includes a shaft (or a thrust plate) and a sleeve but does not have a mechanism such as a ball bearing and (ii) is arranged such that: the shaft (or thrust plate) and the sleeve are rotatably fit with each other with a minute gap between them; a working fluid (lubricant) is contained in the minute gap so as to form a lubricating film; and the shaft (or thrust plate) and the sleeve are held with the lubricating film between them so as not to be in direct contact with each other.

Of such fluid bearings, the following are specifically called "fluid dynamic bearings": a fluid bearing in which a shaft and/or a sleeve have(has) a dynamic pressure-generating groove(s), and the shaft is supported by dynamic pressure; a fluid bearing which includes a thrust plate so that dynamic pressure is generated in a direction perpendicular to the rotation axis of a shaft; and the like. The bearing of the present invention also encompasses such fluid dynamic bearings.

In the fluid dynamic bearings described above, no dynamic pressure is generated while the shaft (or thrust plate) is not rotating. Therefore, while the shaft (or thrust plate) is not rotating, the sleeve and the shaft (or thrust plate) are partly or fully in contact with each other. On the other hand, while the shaft (or thrust plate) is rotating, dynamic pressure is generated by the rotation, and thus the sleeve and the shaft (or thrust plate) separate from each other. That is, in the fluid dynamic bearings, the sleeve and the shaft (or thrust plate) constantly repeat contacting with and separating from each other. Therefore, according to conventional fluid dynamic bearings, (i) metal wear may occur between the sleeve and the shaft (or thrust plate) or (ii) seizure may occur because the sleeve and the shaft (thrust plate) momentarily contact with each other while the shaft (or thrust plate) is rotating. Furthermore, since the bearing is likely to accumulate static electricity, important electronic components such as a magnetic disk may suffer electrostatic destruction. In this regard, a fluid bearing of the present invention is lubricated with the use of the lubricant of the present invention. This reduces the possibility of such metal wear and seizure, and also reduces the likelihood that static electricity is accumulated between the sleeve and the shaft (or thrust plate).

The "impregnated bearing" is not limited to a particular configuration, provided that it is a known impregnated bearing (oil-impregnated bearing) including a porous shaft that is made of sintered metal or synthetic resin and is impregnated with a lubricant of the present invention.

In conventional impregnated bearings, (i) metal wear may occur between the sleeve and the shaft or (ii) seizure may occur because the sleeve and the shaft momentarily contact with each other while the shaft is rotating. Furthermore, since the bearing is likely to accumulate static electricity, important electronic components such as a magnetic disk may suffer electrostatic destruction. In this regard, an impregnated bearing of the present invention is lubricated with the use of the lubricant of the present invention. This reduces the possibility of such metal wear and seizure, and also reduces the likelihood that static electricity is accumulated between the sleeve and the shaft.

As described earlier, the lubricant of the present invention has a lower viscosity (is more power-saving) and is more heat-resistant, antistatic and has a better low-temperature viscosity property than conventional bearing lubricants. In addition, these properties are well-balanced. Accordingly, the bearing of the present invention, which is lubricated with the use of the lubricant of the present invention as a working fluid, can be used as a bearing that achieves long-term stability and durability etc. even in the case where the bearing is rotated at high speed and also is highly power-saving. As such, the bearing of the present invention can be effectively used as a bearing for use in a rotating device etc. of an electronic device, such as an audio-visual device or a personal computer, which has been required to be smaller in size, lighter in weight, larger in memory capacity and higher in information processing speed.

[3. Method for Lubricating Bearing in Accordance with the Present Invention]

A method for lubricating a bearing in accordance with the present invention is characterized by lubricating a bearing of the present invention with the use of a bearing lubricant of the present invention. Since the lubricant of the present invention and the bearing of the present invention have been described in the foregoing [1. Bearing lubricant in accordance with the present invention] and [2. Bearing in accordance with the present invention], respectively, their descriptions are omitted here.

As has been described, the lubricant of the present invention has a lower viscosity (is more power-saving) and is more heat-resistant, antistatic and has a better low-temperature viscosity property than conventional bearing lubricants. In addition, these properties are well-balanced. Accordingly, by using the lubricant of the present invention as a working fluid for lubrication of a bearing (in particular, using the lubricant in a fluid bearing or in an impregnated bearing) to lubricate the bearing, it is possible to achieve long-term stability and durability etc. even in the case where the bearing is rotated at high speed, and thus possible to increase the lifetime of the bearing. This also causes the bearing to be more power-saving.

[4. Motor in Accordance with the Present Invention]

A motor in accordance with the present invention is not limited to a particular configuration, provided that it includes a bearing of the present invention. Since the bearing of the present invention has been described in the foregoing [2. Bearing in accordance with the present invention], its descriptions are omitted here.

Examples of the motor in accordance with the present invention include those provided in known electronic devices such as personal computers, audio devices, visual devices, and car navigation systems.

The motor in accordance with the present invention includes a bearing which is lubricated with the use of a lubricant of the present invention. Therefore, the motor in accordance with the present invention is less likely to suffer metal wear and seizure and less likely to accumulate static electricity between a sleeve and a shaft, as compared with conventional motors. As such, the motor in accordance with the present invention achieves long-term stability and durability etc. even in the case where the bearing is rotated at high speed, and thus increases the lifetime of the motor. Furthermore, the motor in accordance with the present invention can be used as a motor that is more power-saving than conventional motors especially when compared in terms of power consumed while the bearing is rotated at high speed.

[5. Grease in Accordance with the Present Invention]

A grease in accordance with the present invention is characterized by containing a lubricant of the present invention. Since the lubricant of the present invention has been described in the foregoing [1. Bearing lubricant in accordance with the present invention], its descriptions are omitted here.

The grease in accordance with the present invention contains the lubricant of the present invention in an amount of preferably not less than 50 wt %, and further preferably not less than 95 wt %, relative to the total weight of the grease.

The grease in accordance with the present invention may be solid or semisolid at room temperature.

Further, according to the grease in accordance with the present invention, the grease in accordance with the present invention contains a consistency increasing agent (thickener) in an amount that is required for a desired consistency to be achieved.

Usually, the consistency increasing agent is contained in an amount of, for example, 10 wt % to 40 wt % relative to the total weight of the grease.

The "consistency increasing agent" may be one that is usually used in grease. Examples of the consistency increasing agent include, but not limited to, lithium soap, calcium soap, sodium soap, and aluminum soap.

The grease in accordance with the present invention may further contain additives such as antioxidants, extreme-pressure agents, and/or corrosion inhibitors according to need. Each of these additives, when contained in the grease, accounts for 0.1 wt % to 5 wt % of the total weight of the grease. This makes it possible to achieve better practical properties of the grease.

The grease in accordance with the present invention is not particularly limited as to its application, but it is suitable for use as a grease for a bearing, particularly as a grease for a fluid bearing or a grease for an impregnated bearing.

A method for producing the grease in accordance with the present invention is not particularly limited. The grease in accordance with the present invention can be produced by a common grease production method.

Since the grease in accordance with the present invention contains as a base oil the lubricant of the present invention, the grease can be used as a grease that certainly meets all the requirements such as being power-saving, heat-resistant, antistatic and a good low-temperature viscosity property in a well-balanced manner, as compared with conventional greases.

The present invention is not limited to the descriptions of the respective embodiments, but may be altered within the scope of the claims. An embodiment derived from a proper combination of technical means disclosed in different embodiments is encompassed in the technical scope of the invention

EXAMPLES

The following description will discuss the present invention more specifically on the basis of Examples. Note, however, that the present invention is not limited to Examples.

Example 1

Dialkyl carbonate esters represented by the general formula (1′), each of which has ether bonds in its molecular structure, and additives were used to prepare various lubricants. Then, the lubricants were evaluated for the properties that lubricants are required to have. Tables 1 and 2 show compounds of Examples 1 to 5. The compounds of Examples 1 to 5 were synthesized by a known method.

TABLE 1

| | Signs in General Formula (1′) | | | | | | | | | | |
|---|---|---|---|---|---|---|---|---|---|---|---|
| | a | b | d | e | j | k | m | n | f | g | $C_fH_{2f+1}$ | $C_gH_{2g+1}$ |
| Example 1 | 2 | 2 | 2 | 2 | 1 | 1 | 1 | 1 | 6 | 6 | n-hexyl | n-hexyl |
| Example 2 | 2 | 2 | 2 | 2 | 1 | 1 | 1 | 1 | 8 | 8 | 2-ethylhexyl | 2-ethylhexyl |
| Example 3 | 2 | — | — | 2 | 3 | 3 | 0 | 0 | 4 | 4 | n-butyl | n-butyl |
| Example 4 | 2 | — | — | 2 | 1 | 1 | 0 | 0 | 6 | 6 | n-hexyl | n-hexyl |
| Example 5 | — | — | 2 | 2 | 0 | 1 | 1 | 0 | 8 | 6 | 2-ethylhexyl | n-hexyl |

TABLE 2

| | General Formula |
|---|---|
| Example 1 | $C_6H_{13}(-O-C_2H_4)-(O-C_2H_4)-O-(C=O)-O-(C_2H_4-O)-(C_2H_4-O)-C_6H_{13}$ |
| Example 2 | $C_8H_{17}(-O-C_2H_4)-(O-C_2H_4)-O-(C=O)-O-(C_2H_4-O)-(C_2H_4-O)-C_8H_{17}$ |
| Example 3 | $C_4H_9(-O-C_2H_4)_3-O-(C=O)-O-(C_2H_4-O)_3-C_4H_9$ |
| Example 4 | $C_6H_{13}(-O-C_2H_4)-O-(C=O)-O-(C_2H_4-O)-C_6H_{13}$ |
| Example 5 | $C_8H_{17}-O-(C=O)-O-(C_2H_4-O)-(C_2H_4-O)-C_6H_{13}$ |

Furthermore, dilauryl carbonate synthesized by a known method was used as Comparative Example 1, a C14-C15 carbonate ester having a saturated hydrocarbon chain (LIAL-CARB SR-1000/R, produced by MITSUI FINE CHEMICAL. Inc.) proposed in the foregoing Patent Literature 5 was used as Comparative Example 2, dinonyl carbonate synthesized by a known method was used as Comparative Example 3, di-2-ethylhexyl sebacate (DOS) was used as Comparative Example 4, and di-2-ethylhexyl adipate (DOA) was used as Comparative Example 5.

Furthermore, with the use of the compound of Example 1 as a base oil, various additives were added to the compound to obtain a lubricant of Example 6. The additives used here were an amine antioxidant (VANLUBE 81, produced by R.T.VANDERBILT CO., INC.), an anti-rust anti-corrosion agent (Chiolite B-1015, produced by Chiyoda Chemical Co., Ltd.), and an extreme-pressure agent (TPP, produced by DAIHACHI CHEMICAL INDUSTRY CO., LTD.). The same process as in Example 6 was repeated to obtain lubricants of Examples 7 to 10 and Comparative Examples 6 to 10 with the use of the compounds of Examples 2 to 5 and Comparative Examples 1 to 5, respectively, as base oils. The mixing proportions of the base oil and various additives in each of the lubricants of Examples 6 to 10 and Comparative Examples 6 to 10 are shown in Tables 3 and 4.

TABLE 3

| | Example 6 | Example 7 | Example 8 | Example 9 | Example 10 |
|---|---|---|---|---|---|
| Base oil used | Described in Example 1 | Described in Example 2 | Described in Example 3 | Described in Example 4 | Described in Example 5 |
| Base oil (wt %) | 98.4 | 98.4 | 98.4 | 98.4 | 98.4 |
| Antioxidant (wt %) | 1 | 1 | 1 | 1 | 1 |
| Anti-rust anti-corrosion agent (wt %) | 0.1 | 0.1 | 0.1 | 0.1 | 0.1 |
| Extreme-pressure agent (wt %) | 0.5 | 0.5 | 0.5 | 0.5 | 0.5 |

TABLE 4

|  | Comparative Example 6 | Comparative Example 7 | Comparative Example 8 | Comparative Example 9 | Comparative Example 10 |
|---|---|---|---|---|---|
| Base oil used | Described in Comparative Example 1 | Described in Comparative Example 2 | Described in Comparative Example 3 | Described in Comparative Example 4 | Described in Comparative Example 5 |
| Base oil (wt %) | 98.4 | 98.4 | 98.4 | 98.4 | 98.4 |
| Antioxidant (wt %) | 1 | 1 | 1 | 1 | 1 |
| Anti-rust anti-corrosion agent (wt %) | 0.1 | 0.1 | 0.1 | 0.1 | 0.1 |
| Extreme-pressure agent (wt %) | 0.5 | 0.5 | 0.5 | 0.5 | 0.5 |

The compounds of Examples 1 to 5 and Comparative Examples 1 to 5 were measured for their physical properties (40° C. kinetic viscosity, 100° C. kinetic viscosity, viscosity index, −40° C. absolute viscosity, pour point, and volume resistivity), and the lubricants of Examples 6 to 10 and Comparative Examples 6 to 10 were evaluated for their practical properties (heat resistance, oxidation stability and wear resistance). The measurement and evaluation were performed in the following manner.

1) 40° C. kinetic viscosity: Kinetic viscosity was measured with the use of Cannon-Fenske viscometer, in accordance with JIS K 2283.
2) 100° C. kinetic viscosity: Kinetic viscosity was measured with the use of Cannon-Fenske viscometer, in accordance with JIS K 2283.
3) Viscosity index: Viscosity index was calculated in accordance with JIS K 2283.
4) −40° C. absolute viscosity: Absolute viscosity was measured with the use of a rheometer (ARES-RDA) produced by TA instruments.
5) Pour point: Pour point was measured in accordance with JIS K 2269.
6) Volume resistivity: Volume resistivity was measured with a test voltage of 250 V at a relative humidity of 50% and a temperature of 23° C., in accordance with JIS C 2101:1999.
7) Heat resistance test: 2 g of a lubricant was placed in a cylindrical test vessel (which is made of SUS304 and has an inner diameter of 20 mm and a height of 35 mm), and was allowed to stand for 136 hours at 120° C. in a thermoregulated bath with a turntable. How much of the lubricant evaporated was checked.
8) Oxidation stability test: RBOT life was measured in accordance with JIS K 2514.
9) Wear resistance test: Four ball wear test was performed for 1 hour under conditions of 1200 rpm, 40 kg and 75° C., in accordance with ASTM D 4172. After the test, the diameter of a wear track was measured.

The results obtained by measuring the physical properties are shown in Tables 5 and 6, and the results obtained by evaluating the practical properties are shown in Tables 7 to 9.

TABLE 5

|  |  | Example 1 | Example 2 | Example 3 | Example 4 | Example 5 |
|---|---|---|---|---|---|---|
| Molecular weight |  | 407 | 463 | 439 | 318 | 347 |
| Kinetic viscosity (mm²/s) | 40° C. | 9.9 | 11.9 | 11.6 | 6.0 | 6.7 |
|  | 100° C. | 2.8 | 3.1 | 3.2 | 1.9 | 2.0 |
| Viscosity index |  | 130 | 123 | 145 | 91 | 85 |
| −40° C. absolute viscosity (Pa · s) |  | 1.4 | 3.9 | — | 0.5 | 0.8 |
| Pour point (° C.) |  | <−50 | <−50 | −20 | <−50 | <−50 |
| Volume resistivity (Ω · cm) |  | — | $5.6 \times 10^{11}$ | $9.8 \times 10^{9}$ | $8.6 \times 10^{11}$ | $8.4 \times 10^{11}$ |

TABLE 6

|  |  | Comparative Example 1 | Comparative Example 2 | Comparative Example 3 | Comparative Example 4 | Comparative Example 5 |
|---|---|---|---|---|---|---|
| Molecular weight |  | 399 | 470 | 315 | 427 | 371 |
| Kinetic viscosity (mm²/s) | 40° C. | 12.3 | 17.6 | 6.5 | 11.6 | 7.7 |
|  | 100° C. | 3.4 | 3.9 | 2.1 | 3.2 | 2.3 |
| Viscosity index |  | 164 | 120 | 134 | 149 | 117 |
| −40° C. absolute viscosity (Pa · s) |  | — | — | — | 1.6 | — |
| Pour point (° C.) |  | 15 | −40 | −5 | <−50 | <−50 |
| Volume resistivity (Ω · cm) |  | $1.3 \times 10^{13}$ | $2 \times 10^{13}$ | $6.6 \times 10^{12}$ | $2.1 \times 10^{12}$ | $2.2 \times 10^{11}$ |

TABLE 7

|  | Example 6 | Example 7 | Example 8 | Example 9 | Example 10 |
|---|---|---|---|---|---|
| Evaporation amount (%) | 2.16 | 1.80 | 1.32 | 28.82 | 19.45 |

TABLE 8

|  | Comparative Example 6 | Comparative Example 7 | Comparative Example 8 | Comparative Example 9 | Comparative Example 10 |
|---|---|---|---|---|---|
| Evaporation amount (%) | 2.65 | 2.48 | 26.12 | 2.17 | 16.84 |

TABLE 9

|  | Example 6 | Comparative Example 9 |
|---|---|---|
| RBOT life (minutes) | >3600 | 1320 |
| Diameter of wear track (mm) | 0.46 | 0.45 |

The compound of Example 1 is different from the dilauryl carbonate of Comparative Example 1 in that carbon atoms on an alkyl chain are substituted by four ether oxygen atoms. In the compound of Example 1, the 40° C. kinetic viscosity, 100° C. kinetic viscosity, viscosity index and −40° C. absolute viscosity were all lower than those of the dilauryl carbonate of Comparative Example 1. This showed that the compound of Example 1 is highly power-saving and has a very good low-temperature fluidity. Furthermore, it was found that the compound of Example 1 has a lower viscosity and a better low-temperature fluidity than the di-2-ethylhexyl sebacate of Comparative Example 4.

The lubricant of Example 6, which contains as a base oil the compound of Example 1, was compared with the lubricants of Comparative Examples 6 and 9, which contain as base oils the compounds of Comparative Examples 1 and 4, respectively, in terms of the amount of evaporation. As a result, it was found that the amount of evaporation of the lubricant of Example 6 was less than that of the lubricant of Comparative Example 6. It was also found that the amount of evaporation of the lubricant of Example 6 was substantially the same as that of the lubricant of Comparative Example 9. This showed that the lubricant of Example 6 has a good heat resistance. Furthermore, it was found that the lubricant of Example 6 has a better oxidation stability than the lubricant of Comparative Example 9 and has a wear resistance equivalent to that of the lubricant of Comparative Example 9. This showed that the compound of Example 1 can be used effectively as a lubricant base (lubricant base oil) for fluid dynamic bearings which is highly power-saving and has a good heat resistance, oxidation stability and wear resistance.

Each of the compounds of Examples 2 and 3 has a molecular weight substantially equivalent to that of the compound of Comparative Example 2, but has a plurality of ether oxygen atoms in its molecular structure. It was found that the compounds of Examples 2 and 3 have a considerably lower viscosity than the carbonate ester of Comparative Example 2, which contains no ether oxygen atoms. It was also found that the compounds of Examples 2 and 3 have a lower volume resistivity than the compounds of Comparative Examples 2 and 4. This showed that the compounds of Examples 2 and 3 are highly antistatic.

The lubricants of Examples 7 and 8, which contain as base oils the compounds of Examples 2 and 3, respectively, were compared with the lubricants of Comparative Examples 8 and 9, which contain as base oils the compounds of Comparative Examples 2 and 4, respectively, in terms of the amount of evaporation. As a result, it was found that the amounts of evaporation of the lubricants of Examples 7 and 8 were much less than that of the lubricant of Comparative Example 7. It was also found that the amounts of evaporation of the lubricants of Examples 7 and 8 were less than that of the lubricant of Comparative Example 9. This showed that the lubricants of Examples 7 and 8 are highly heat-resistant. That is, it was found that each of the compounds of Example 2 and 3 can be used effectively as a lubricant base for fluid dynamic bearings which is highly power-saving and has a good heat resistance and antistatic property.

The compound of Example 4 has two ether oxygen atoms in its molecular structure. It was found that the compound of Example 4 has a lower viscosity, better low-temperature fluidity and lower volume resistivity than the dinonyl carbonate of Comparative Example 3, which contains no ether oxygen atoms. This showed that the compound of Example 4 is highly power-saving and, in particular, highly antistatic.

The lubricant of Example 9, which contains as a base oil the compound of Example 4, was compared with the lubricant of Comparative Example 8, which contains as a base oil the compound of Comparative Example 3, in terms of the amount of evaporation. As a result, it was found that the amount of evaporation of the lubricant of Example 9 and the amount of evaporation of the lubricant of Comparative Example 8 were substantially the same. This showed that the lubricant of Example 9 has an appropriate level of heat resistance despite its low viscosity, as compared with the lubricant of Comparative Example 8.

It was found that the compound of Example 5 has a lower viscosity than the compound of Comparative Example 5. The lubricant of Example 10, which contains as a base oil the compound of Example 5, was compared with the lubricant of Comparative Example 10, which contain as a base oil the compound of Comparative Example 5, in terms of the amount of evaporation. As a result, it was found that the amount of evaporation of the lubricant of Example 10 was slightly larger than that of the lubricant of Comparative Example 10. This showed that the lubricant of Example 10 has an appropriate level of heat resistance despite its low viscosity, as compared with the lubricant of Comparative Example 10.

INDUSTRIAL APPLICABILITY

A lubricant in accordance with the present invention is more power-saving, heat-resistant and antistatic, and has a better low-temperature viscosity property than conventional bearing lubricants. In addition, these properties are well-balanced. Accordingly, the lubricant in accordance with the present invention is suitably usable not only as a lubricant for a fluid bearing but also as a lubricant for a usual bearing, a lubricant for an impregnated bearing, a base oil for grease, and the like. Therefore, the lubricant in accordance with the present invention is of great industrial value in all technical fields that use a lubricant.

The invention claimed is:

1. A bearing lubricant, comprising a compound represented by the following general formula (1):

$$C_fH_{2f+1}-R^1_a-O-(C=O)-O-R^2_b-C_gH_{2g+1} \qquad (1)$$

wherein O represents an oxygen atom; C represents a carbon atom; H represents a hydrogen atom; $R^1$ and $R^2$ independently represent a C2-C48 oxaalkylene group having 1 to 6 oxygen atoms; a and b independently represent an integer of 0 or 1 and satisfy a+b≥1; f represents an integer of 8 to 12; and g represents an integer of 1 to 12, wherein the bearing lubricant is a fluid bearing lubricant or an impregnated bearing lubricant, and wherein the bearing lubricant has a volume resistivity of not more than $1 \times 10^{12}$ Ω·cm, a kinetic viscosity at 40° C. of 6 mm²/s to 13 mm²/s, a viscosity index of not less than 80, and a pour point of not higher than −20° C.

2. A bearing lubricant, comprising a compound represented by the following general formula (1'):

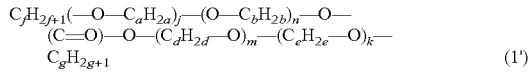

$C_fH_{2f+1}(\text{—O—}C_aH_{2a})_j\text{—}(O\text{—}C_bH_{2b})_n\text{—O—}(C\text{=}O)\text{—O—}(C_dH_{2d}\text{—O})_m\text{—}(C_eH_{2e}\text{—O})_k\text{—}C_gH_{2g+1}$ (1')

wherein O represents an oxygen atom; C represents a carbon atom; H represents a hydrogen atom; a, b, d and e independently represent an integer of 2 to 8; j, k, m and n independently represent an integer of 0 to 3 and satisfy j+k+m+n≥1; f represents an integer of 8 to 12; and g represents an integer of 1 to 12, wherein the bearing lubricant is a fluid bearing lubricant or an impregnated bearing lubricant, and wherein the bearing lubricant has a volume resistivity of not more than $1 \times 10^{12}$ Ω·cm, a kinetic viscosity at 40° C. of 6 mm²/s to 13 mm²/s, a viscosity index of not less than 80, and a pour point of not higher than −20° C.

3. The bearing lubricant according to claim 1, which has an amount of evaporation of not more than 3% when 2 g of the bearing lubricant placed in a cylindrical test vessel that is made of SUS304 and that has an inner diameter of 20 mm and a height of 35 mm has been allowed to stand for 136 hours at 120° C. in a thermoregulated bath with a turntable.

4. A fluid bearing or an impregnated bearing which is lubricated with use of the bearing lubricant recited in claim 1.

5. A method for lubricating a bearing, comprising:
lubricating a bearing using the bearing lubricant recited in claim 1.

6. A motor comprising the bearing recited in claim 4.

7. A method for producing a grease, comprising using the bearing lubricant recited in claim 1.

8. A grease comprising the bearing lubricant recited in claim 1.

9. The bearing lubricant according to claim 2, which has an amount of evaporation of not more than 3% when 2 g of the bearing lubricant placed in a cylindrical test vessel that is made of SUS304 and that has an inner diameter of 20 mm and a height of 35 mm has been allowed to stand for 136 hours at 120° C. in a thermoregulated bath with a turntable.

10. A fluid bearing or an impregnated bearing which is lubricated with use of the bearing lubricant recited in claim 2.

11. A method for lubricating a bearing, comprising:
lubricating a bearing using the bearing lubricant recited in claim 2.

12. A motor comprising the bearing recited in claim 10.

13. A method for producing a grease, comprising using the bearing lubricant recited in claim 2.

14. A grease comprising the bearing lubricant recited in claim 2.

* * * * *